United States Patent
Kosmach et al.

(10) Patent No.: US 9,671,931 B2
(45) Date of Patent: Jun. 6, 2017

(54) METHODS AND SYSTEMS FOR VISUALLY DEEMPHASIZING A DISPLAYED PERSONA

(71) Applicant: Personify, Inc., Chicago, IL (US)

(72) Inventors: James J. Kosmach, Geneva, IL (US); Sumant Kowshik, Champaign, IL (US); Dennis J. Lin, Chicago, IL (US); Glenn B. Francisco, Chicago, IL (US); John Nicholas Timmons, Urbana, IL (US); Fernando Rossi Goncalves, Berlin (DE)

(73) Assignee: Personify, Inc., Chicago, IL (US)

( * ) Notice: Subject to any disclaimer, the term of this patent is extended or adjusted under 35 U.S.C. 154(b) by 324 days.

(21) Appl. No.: 14/588,967

(22) Filed: Jan. 4, 2015

(65) Prior Publication Data

US 2016/0196675 A1 Jul. 7, 2016

(51) Int. Cl.
*G06F 3/0482* (2013.01)
*G06F 3/0484* (2013.01)
*G06F 3/0481* (2013.01)

(52) U.S. Cl.
CPC ........ *G06F 3/0482* (2013.01); *G06F 3/04812* (2013.01); *G06F 3/04845* (2013.01)

(58) Field of Classification Search
CPC .................................................. G06F 3/0482
USPC ........................................................ 715/731
See application file for complete search history.

(56) References Cited

U.S. PATENT DOCUMENTS

| | | | |
|---|---|---|---|
| 5,001,558 A | 3/1991 | Burley et al. | |
| 5,022,085 A * | 6/1991 | Cok | G06T 5/20 345/611 |
| 5,343,311 A * | 8/1994 | Morag | G06T 11/001 358/500 |
| 5,506,946 A * | 4/1996 | Bar | G06T 11/001 345/600 |
| 5,517,334 A | 5/1996 | Morag et al. | |
| 5,534,917 A * | 7/1996 | MacDougall | G06K 9/00375 348/169 |
| 6,119,147 A * | 9/2000 | Toomey | G06Q 10/109 709/204 |
| 6,150,930 A | 11/2000 | Cooper | |
| 6,618,444 B1 * | 9/2003 | Haskell | H04N 9/75 348/592 |
| 6,664,973 B1 | 12/2003 | Iwamoto et al. | |

(Continued)

FOREIGN PATENT DOCUMENTS

WO  2013019259  2/2013

OTHER PUBLICATIONS

Working screenshot of Snagit manufactured by Techsmith, relsesed Apr. 18, 2014.*

*Primary Examiner* — Reza Nabi
(74) *Attorney, Agent, or Firm* — Invention Mine LLC (57) ABSTRACT

Described herein are methods and systems for visually deemphasizing a displayed persona. At least one embodiment takes the form of a method carried out by a user-interface (UI)-management device. The UI-management device identifies a persona region of a displayed persona and identifies a user-interface-focus location. The UI-management device then makes a persona-deemphasize determination based on the identified persona region and the identified user-interface-focus location. In response to making the persona-deemphasize determination, the UI-management device visually deemphasizes the displayed persona.

44 Claims, 12 Drawing Sheets (56) References Cited

U.S. PATENT DOCUMENTS

| | | | | |
|---|---|---|---|---|
| 6,760,749 B1* | 7/2004 | Dunlap | | H04N 7/147 |
| | | | | 348/14.08 |
| 7,124,164 B1* | 10/2006 | Chemtob | | G06Q 10/10 |
| | | | | 709/204 |
| 7,518,051 B2 | 4/2009 | Redmann | | |
| 7,755,016 B2 | 7/2010 | Toda et al. | | |
| 7,770,115 B2 | 8/2010 | Gallmeier | | |
| 7,773,136 B2 | 8/2010 | Ohyama et al. | | |
| 7,821,552 B2* | 10/2010 | Suzuki | | H04N 5/332 |
| | | | | 348/167 |
| 7,831,087 B2* | 11/2010 | Harville | | G06K 9/00201 |
| | | | | 382/103 |
| 8,094,928 B2* | 1/2012 | Graepel | | G06K 9/00355 |
| | | | | 345/419 |
| 8,225,208 B2* | 7/2012 | Sprang | | G11B 27/034 |
| | | | | 715/716 |
| 8,264,544 B1 | 9/2012 | Chang | | |
| 8,345,082 B2 | 1/2013 | Tysso | | |
| 8,379,101 B2* | 2/2013 | Mathe | | G06K 9/00342 |
| | | | | 348/222.1 |
| 8,411,148 B2* | 4/2013 | Hsieh | | H04N 17/002 |
| | | | | 348/187 |
| 8,411,149 B2 | 4/2013 | Maison | | |
| 8,533,593 B2 | 9/2013 | Grossman | | |
| 8,533,594 B2 | 9/2013 | Grossman | | |
| 8,533,595 B2 | 9/2013 | Grossman | | |
| 8,588,515 B2* | 11/2013 | Bang | | G06T 5/50 |
| | | | | 382/106 |
| 8,649,932 B2* | 2/2014 | Mian | | G01M 17/013 |
| | | | | 250/316.1 |
| 8,659,658 B2* | 2/2014 | Vassigh | | G06F 3/011 |
| | | | | 348/143 |
| 8,666,153 B2* | 3/2014 | Hung | | H04N 1/486 |
| | | | | 382/162 |
| 8,701,002 B2 | 4/2014 | Grossman | | |
| 8,818,028 B2* | 8/2014 | Nguyen | | H04N 5/272 |
| | | | | 382/103 |
| 8,874,525 B2* | 10/2014 | Grossman | | G06F 17/2288 |
| | | | | 707/665 |
| 8,890,923 B2* | 11/2014 | Tian | | H04N 7/15 |
| | | | | 348/14.03 |
| 8,890,929 B2 | 11/2014 | Paithankar | | |
| 8,913,847 B2 | 12/2014 | Tang | | |
| 8,994,778 B2* | 3/2015 | Weiser | | H04N 7/152 |
| | | | | 348/14.08 |
| 9,008,457 B2* | 4/2015 | Dikmen | | G06T 5/008 |
| | | | | 382/274 |
| 9,065,973 B2 | 6/2015 | Graham | | |
| 9,088,692 B2* | 7/2015 | Carter | | H04N 7/15 |
| 2002/0158873 A1* | 10/2002 | Williamson | | G06T 15/20 |
| | | | | 345/427 |
| 2006/0259552 A1* | 11/2006 | Mock | | H04L 29/06027 |
| | | | | 709/204 |
| 2008/0266380 A1 | 10/2008 | Gorzynski | | |
| 2009/0199111 A1 | 8/2009 | Emori | | |
| 2011/0242277 A1* | 10/2011 | Do | | H04N 5/272 |
| | | | | 348/43 |
| 2011/0304632 A1* | 12/2011 | Evertt | | G06F 3/011 |
| | | | | 345/474 |
| 2012/0314077 A1 | 12/2012 | Clavenna, II | | |
| 2013/0094780 A1 | 4/2013 | Tang | | |
| 2013/0129205 A1 | 5/2013 | Wang | | |
| 2014/0245190 A1* | 8/2014 | Bragdon | | G06Q 10/1095 |
| | | | | 715/753 |
| 2014/0300630 A1 | 10/2014 | Flider | | |
| 2016/0196675 A1* | 7/2016 | Kosmach | | G06F 3/04845 |
| | | | | 715/731 |

* cited by examiner

METHODS AND SYSTEMS FOR VISUALLY DEEMPHASIZING A DISPLAYED PERSONA

This application is related to the following patent documents, the contents of each of which are incorporated into this disclosure: (i) U.S. patent application Ser. No. 13/083,470, entitled "Systems and Methods for Accurate User Foreground Video Extraction," filed Apr. 8, 2011 and published Oct. 13, 2011 as U.S. Patent Application Pub. No. US2011/0249190, (ii) U.S. patent application Ser. No. 13/076,264, entitled "Systems and Methods for Embedding a Foreground Video into a Background Feed based on a Control Input," filed Mar. 30, 2011 and published Oct. 6, 2011 as U.S. Patent Application Pub. No. US2011/0242277, and (iii) unpublished U.S. Patent Application entitled "System and Methods for Persona Identification Using Combined Probability Maps," filed Dec. 31, 2013 and having Ser. No. 14/145,874.

BACKGROUND

Online data communications are quite prevalent and pervasive in modern society, and are becoming more so all the time. Moreover, developments in software, communication protocols, and peripheral devices (e.g., video cameras), along with developments in other computing disciplines, have collectively enabled and facilitated the inclusion of multimedia experiences as part of such communications. These multimedia experiences take forms such as audio chats, video chats (that are usually also audio chats), online meetings (e.g., web meetings), and the like.

Using the context of online meetings as an illustrative example, it is often the case that one of the participants is the designated presenter, and often this designated presenter opts to include some visual materials as part of the offered presentation. Such visual materials may take the form of (or at least include) visual aids such as shared desktops, multiple-slide presentations, and the like. In some instances, from the perspective of another attendee at the online meeting, only such visual materials are presented on the display of the online meeting, while the presenter participates only as an audio voiceover. In other instances, the presenter may be shown in one region of the display while the visual materials are shown in another. And other similar examples exist as well.

OVERVIEW

Described herein are methods and systems for visually deemphasizing a displayed persona. A "persona" of a presenter may be extracted from a video feed of a video camera that is capturing video of the presenter. The extracted persona, which in some examples appears as a depiction of the presenter from the torso up (i.e., upper torso, shoulders, arms, hands, neck, and head), may then be visually combined with content such as a multiple-slide presentation such that the presenter appears to attendees of an online meeting to be superimposed over the content, thus personalizing and otherwise enhancing the attendees' experiences.

At least one embodiment of the present disclosure takes the form of a method carried out by a user-interface (UI)-management device. The UI-management device identifies a persona region of a displayed persona and identifies a user-interface-focus location. The UI-management device then makes a persona-deemphasize determination based on the identified persona region and the identified user-interface-focus location. In response to making the persona-deemphasize determination, the UI-management device visually deemphasizes the displayed persona.

At least one embodiment takes the form of a UI-management device that includes a wireless-communication interface, a processor, and data storage containing instructions executable by the processor for causing the UI-management device to carry out at least the functions described in the preceding paragraph. Moreover, any of the variations and permutations that are described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments.

In at least one embodiment, the persona-deemphasize determination is based on a calculated display distance between a persona-region location of the persona region and the user-interface-focus location.

In at least one such embodiment, the persona-deemphasize determination is further based on a determination that the calculated display distance is less than a proximity threshold.

In at least one other such embodiment, the persona-region location is a location within the persona region that is closest to the user-interface-focus location. In at least one other such embodiment, the persona-region location is a centroid of the persona region. In at least one other such embodiment, the persona-region location is a centroid of a minimum-bounding box that encloses the persona region.

In at least one embodiment, the persona-deemphasize determination is based on a determination that the user-interface-focus location is within a deemphasize region of the persona region.

In at least one embodiment, the user-interface-focus location is a mouse-pointer location. In at least one other embodiment, the user-interface-focus location is a stylus location.

In at least one embodiment, the user-interface-focus location is a location within a user-interface region.

In at least one such embodiment, the user-interface region is a focus-window region of a focus window. In at least one such embodiment, the focus window is a selected window. In at least one such embodiment, the selected window is a moved window.

In at least one other such embodiment, the user-interface-focus location is a location within the user-interface region that is closest to the persona-region location. In at least one other such embodiment, the user-interface-focus location is a centroid of the user-interface region. In at least one other such embodiment, the user-interface-focus location is a centroid of a minimum-bounding box that encloses the user-interface region.

In at least one other such embodiment, the persona-deemphasize determination comprises a partial-overlap determination that the user-interface region at least partially overlaps the persona region. In at least one other such embodiment, the persona-deemphasize determination comprises a total-overlap determination that the user-interface region totally overlaps the persona region.

In at least one embodiment, visually deemphasizing the displayed persona comprises decreasing an opacity of the displayed persona. In at least one other embodiment, visually deemphasizing the displayed persona comprises decreasing a display size of the displayed persona.

In at least one embodiment, the UI-management device presents a user-interface-adjustment menu in response to making the persona-deemphasize determination. The user-interface-adjustment menu (i) at least partially overlaps the persona region and (ii) comprises a set of one or more user-interface-adjustment-menu options that are associated with respective user-interface-adjustment functions. In at least one such embodiment, one of the respective user-interface-adjustment functions comprises muting an audio presentation associated with the displayed persona. In at least one other such embodiment, one of the respective user-interface-adjustment functions comprises hiding the displayed persona.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Figure 1:
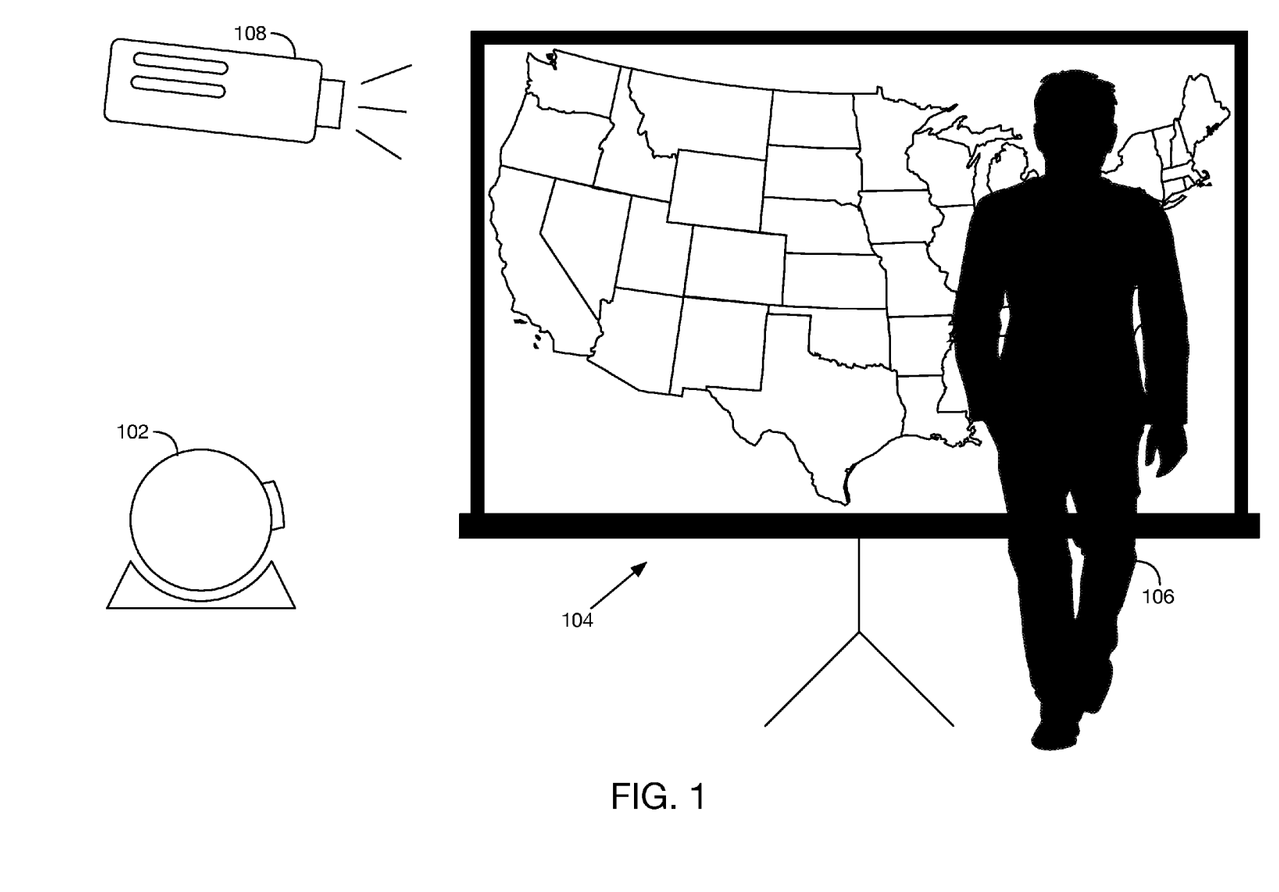
FIG. 1 depicts aspects of persona extraction, in accordance with at least one embodiment.

FIG. 1 depicts aspects of persona extraction, in accordance with at least one embodiment. A video camera 102 captures a video stream of a scene 104 in which a presenter 106 is positioned. A projector 108 projects an image (such as a multi-slide presentation) onto the scene. For each video frame in the captured video stream, pixels that represent the presenter (and pixels that do not) are identified, and "alpha masks" for each frame are generated, where a given alpha mask may take the form of or at least include an array with a respective stored data element corresponding to each pixel in the corresponding frame, where such stored data elements are individually and respectively set equal to 1 (one) for each presenter pixel and to 0 (zero) for every other pixel (i.e., for each non-presenter (a.k.a. background) pixel).

The described alpha masks correspond in name with the definition of the "A" in the "RGBA" pixel-data format known to those of skill in the art, where "R" is a red-color value, "G" is a green-color value, "B" is a blue-color value, and "A" is an alpha value ranging from 0 (complete transparency) to 1 (complete opacity). In a typical implementation, the "0" in the previous sentence may take the form of a hexadecimal number such as 0x00 (equal to a decimal value of 0 (zero)), while the "1" may take the form of a hexadecimal number such as 0xFF (equal to a decimal value of 255); that is, a given alpha value may be expressed as an 8 bit number that can be set equal to any integer that is (i) greater than or equal to zero and (ii) less than or equal to 255. Moreover, a typical RGBA implementation provides for such an 8 bit alpha number for each of what are known as the red channel, the green channel, and the blue channel; as such, each pixel has (i) a red ("R") color value whose corresponding transparency value can be set to any integer value between 0x00 and 0xFF, (ii) a green ("G") color value whose corresponding transparency value can be set to any integer value between 0x00 and 0xFF, and (iii) a blue ("B") color value whose corresponding transparency value can be set to any integer value between 0x00 and 0xFF. And certainly other pixel-data formats could be used, as deemed suitable by those having skill in the relevant art for a given implementation.

The extracted persona may be merged with content (such as the content projected by projector 108) in a manner consistent with these conventions. In particular, on a pixel-by-pixel (i.e., pixel-wise) basis, the merging is carried out using pixels from the captured video frame for which the corresponding alpha-mask values equal 1, and otherwise using pixels from the content. Pixel data structures will typically include (or be associated with) one or more other values corresponding respectively to one or more other properties of the pixel, where brightness is an example of one such property. In some embodiments, the brightness value is the luma component of the image or video frame. In other embodiments, the brightness value is the pixel values of one of an R, G, or B color channel, or other similar color space (e.g., gamma compressed RGB, or R'G'B', or YUV, or YCbCr, as examples). In other embodiments, the brightness value may be a weighted average of pixel values from one or more color channels. And other approaches exist as well.

Figure 2:
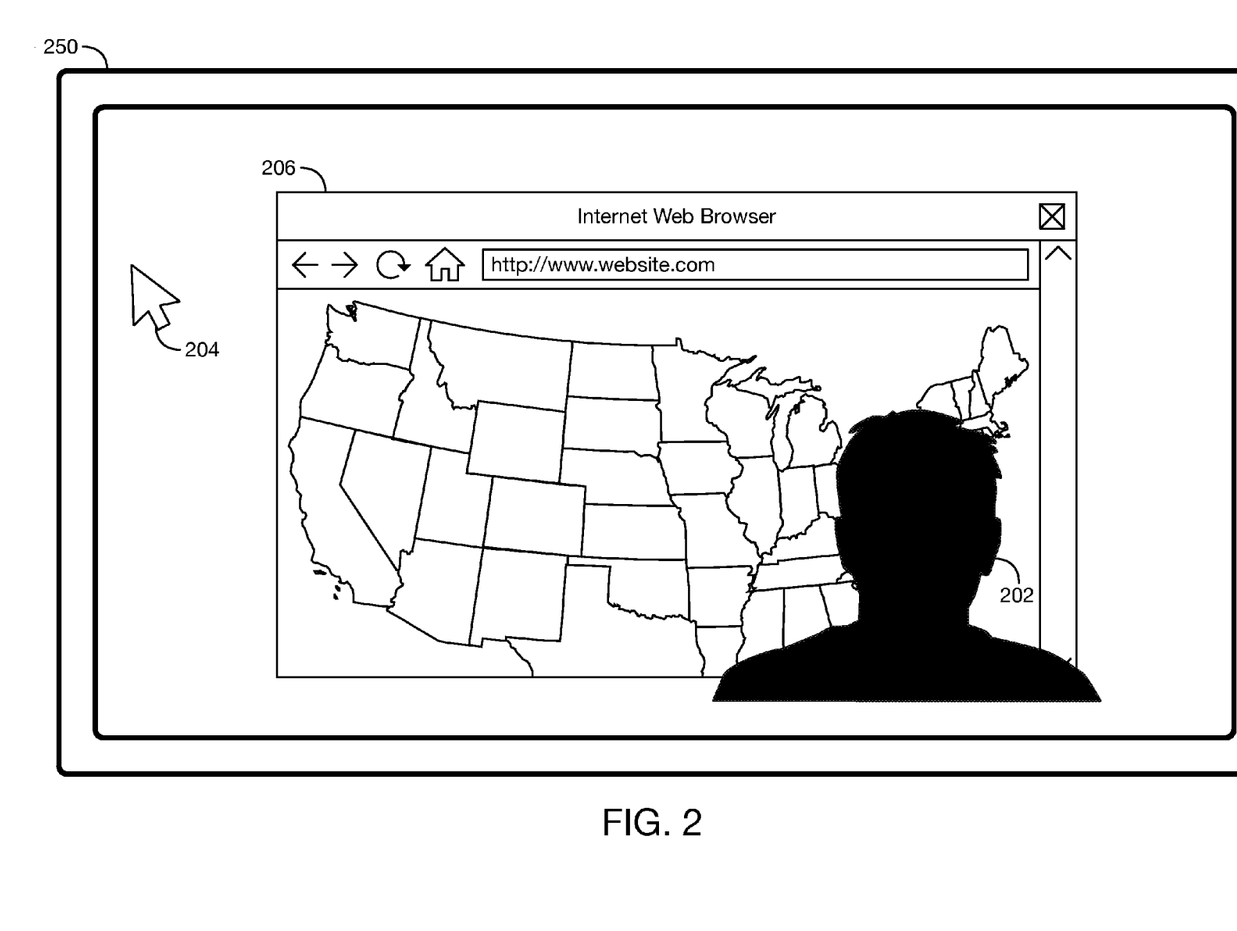
FIG. 2 depicts a presentation of a user interface (UI) that includes a displayed persona, in accordance with at least one embodiment.

FIG. 2 depicts a presentation of a user interface that includes a displayed persona, in accordance with at least one embodiment. As shown, a presentation 250 of a user interface includes a displayed persona 202, a mouse pointer 204, and a window 206. Displayed persona 202 may be based on received persona data that may represent, for example, an extracted persona, content for display via window 206, and/or an extracted persona that has been merged with content, among other examples. The user interface may use windows, icons, menus, pointers, and other UI elements to facilitate interaction with a user. Persona 202 could be a UI element that is selectable and movable in a manner similar to, for example, a desktop window (such as window 206). Window 206 may display content such as a multi-slide presentation, a video game, and/or a website, as examples. Additional aspects of displayed persona 202, mouse pointer 204, and window 206 are described below.

Figure 3:
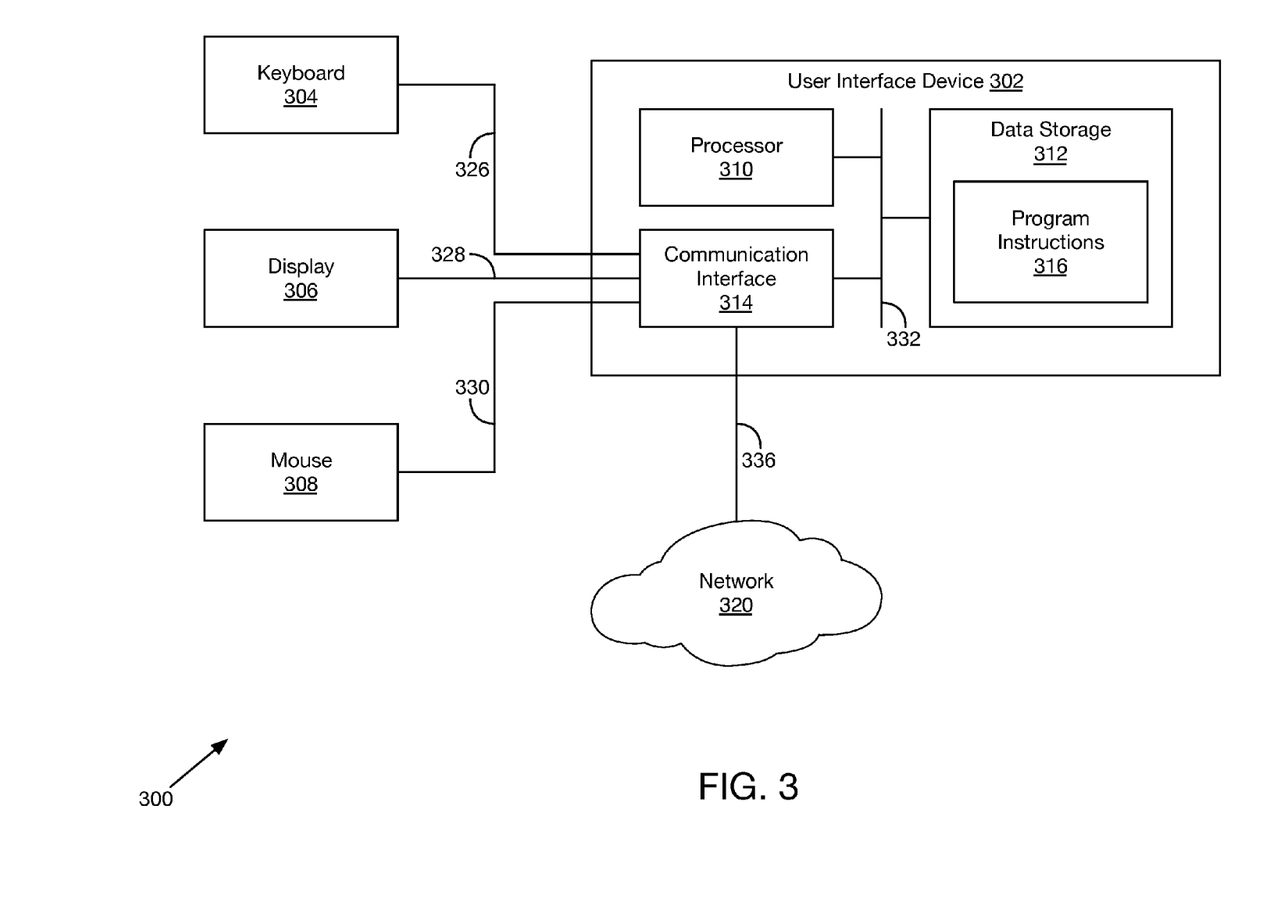
FIG. 3 depicts a block diagram of a UI-management system, in accordance with at least one embodiment.

FIG. 3 depicts a block diagram of a UI-management system, in accordance with at least one embodiment. As shown, a UI-management system 300 includes a UI-management device 302, a keyboard 304, a display 306, and a mouse 308.

UI-management device 302 includes a processor 310, a data storage 312, and a communication interface 314, all of which are interconnected via a system bus 332. Those of skill in the art will appreciate that UI-management device 302 could include different and/or additional elements. UI-management device 302 could take the form of a desktop computer, a laptop computer, a server computer, a tablet computer, and/or a smartphone, among other examples.

Processor 310 may include one or more processors of any type deemed suitable by those of skill in the relevant art, some examples including a microprocessor and a dedicated digital signal processor (DSP).

Data storage 312 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, data storage 312 contains program instructions 316 executable by processor 310 for carrying out various functions, though data storage 312 may contain different and/or additional data. In an embodiment in which UI-management device 302 is configured to carry out one or more processes and/or functions (such as the processes and functions described below with reference to FIG. 4), program instructions 316 are executable by processor 310 for carrying out those functions. In instances where other entities described herein have a structure similar to that depicted in and described in connection with FIG. 3, the respective program instructions 316 stored by the respective data storages 312 of those respective devices are executable by their respective processors 310 to carry out functions respectively performed by those devices.

Communication interface 314 may include any necessary hardware (e.g., chipsets, antennas, Ethernet cards, and the like), any necessary firmware, and/or any necessary software for conducting one or more forms of communication. Communication interface 314 may be configured to communicate according to one or more wired- and/or wireless-communication types and/or protocols described herein or otherwise deemed suitable by those having skill in the relevant art for a given implementation or in a given context.

Keyboard 304, display 306, and mouse 308 are depicted as being communicatively connected to communication interface 314 via communication links 326, 328, and 330, respectively, and processor 310, data storage 312, and communication interface 314 are shown as being interconnected via a communication link 332 (which could be a system bus, for example). Any one or more of communication links 326-332 could take the form of one or more wired and/or wireless communication links, and communication over communication links 326-332 may comply with one or more communication protocols such as IEEE 802.15 (Bluetooth), universal serial bus (USB), IEEE 1394 (FireWire), IEEE 802.11 (Wi-Fi), 802.3 (Ethernet), digital visual interface (DVI), and/or high-definition multimedia interface (HDMI), among numerous other possibilities. One or more routers, switches, gateways, hubs, repeaters, and the like may be disposed along communication links 326-332. For example, even though keyboard 304, display 306, and mouse 308 are depicted as being directly connected to communication interface 314, these components could instead (or additionally) be communicatively connected to user-interface device 302 via a network 120, which could take the form of a packet-switched network (such as the Internet) or any other suitable network.

Figure 4:
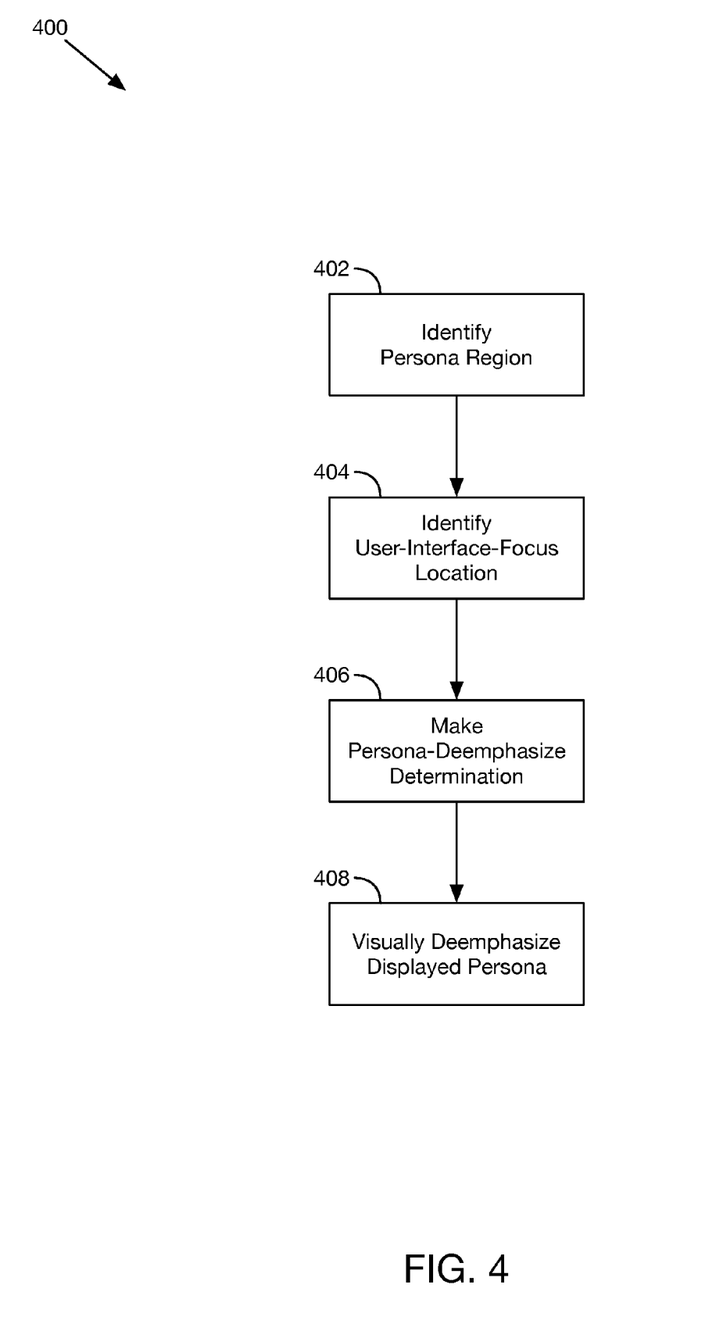
FIG. 4 depicts a flowchart of a method, in accordance with at least one embodiment.

FIG. 4 depicts a flowchart of a method, in accordance with at least one embodiment. As shown, a method 400 begins at step 402 with UI-management device 302 identifying a persona region of displayed persona 202 (which could include, for example, identifying a persona-region location of the persona region). At step 404, UI-management device 302 identifies a user-interface-focus location and, at step 406, UI-management device 302 makes a persona-deemphasize determination based on the persona region and the user-interface-focus location identified at steps 402 and 404, respectively. At step 408, and in response to making the persona-deemphasize determination at step 406, UI-management device 302 visually deemphasizes displayed persona 202.

Figure 5:
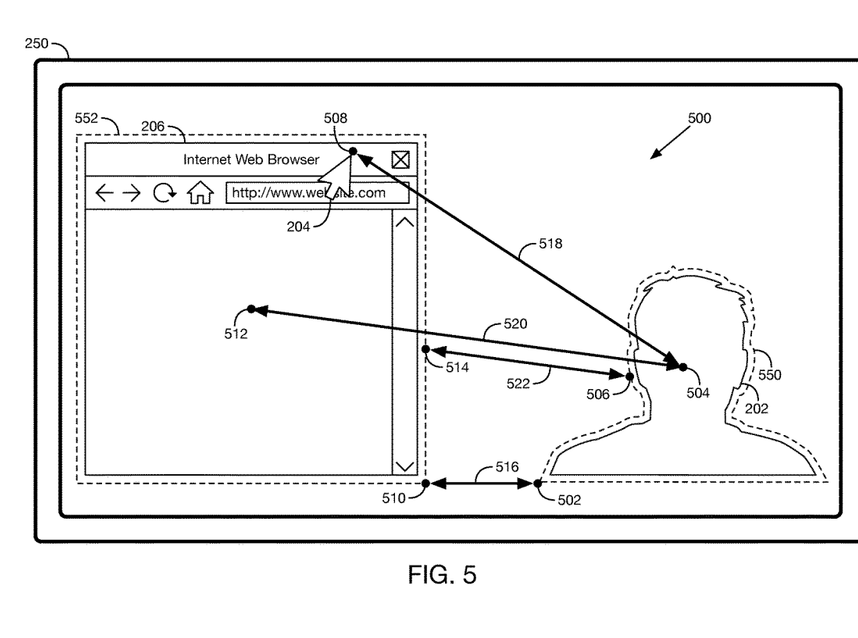
FIG. 5 depicts example persona-region locations and user-interface-focus locations, in accordance with at least one embodiment.

In at least one embodiment, the persona-deemphasize determination is based on a calculated display distance between an identified persona-region location and the identified user-interface-focus location. For example, FIG. 5 depicts example persona-region locations and user-interface-focus locations, in accordance with at least one embodiment. As shown in the context of presentation 250, a set 500 of locations includes persona-region locations 502, 504, and 506 and user-interface-focus locations 508, 510, 512, and 514. Each of line segments 516, 518, 520, and 522 represents a distance between a respective persona-region location and a respective user-interface-focus location. The persona-deemphasize determination may be based on, for example, a determination that a calculated display distance (represented by one or more of line segments 516-522) is less than a proximity threshold. The display distance could be calculated as a number of pixels, points, and/or inches, among other possibilities that will be known to those of skill in the art.

Persona-region location 502 is a location within a persona region 550 that is closest to a given user-interface-focus location. In the illustrated embodiment, persona-region location 502 is located at an endpoint of line segment 516, which represents the shortest-possible line segment between persona region 550 and a user-interface region 552 (which described in additional detail below).

Persona-region location 504 is a centroid of a minimum-bounding box that encloses persona region 550 (as depicted in and explained below in connection with FIG. 6). In an embodiment, the centroid of a given region (e.g., of the minimum-bounding box) is the average position of all points (e.g., pixels) in the given region. In at least one embodiment, a persona-region location of persona region 550 is the centroid of persona region 550 itself.

Figure 6:
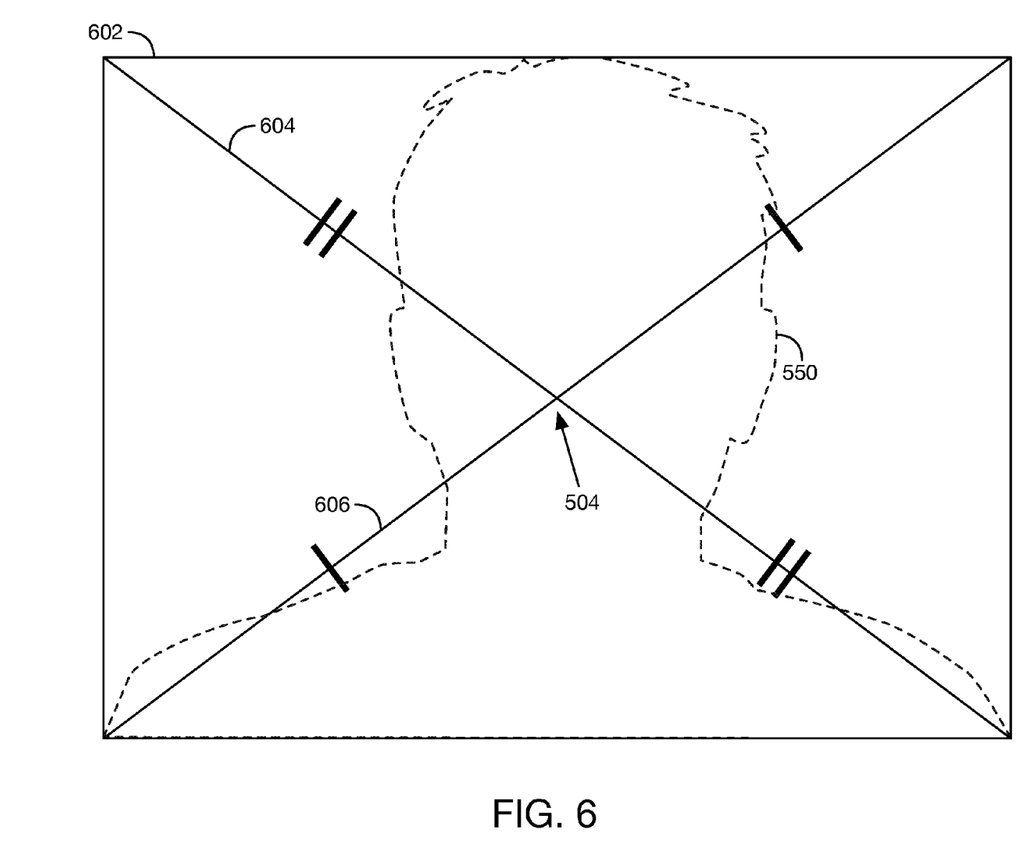
FIG. 6 depicts a centroid of a minimum-bounding box that encloses a persona region, in accordance with at least one embodiment.

FIG. 6 depicts a centroid of a minimum-bounding box that encloses persona region 550, in accordance with at least one embodiment. A minimum-bounding box 602 is the smallest rectangular area that completely encloses persona region 550, and the centroid of minimum-bounding box 602 (at which persona-region location 504 is located) is the intersection of diagonals 604 and 606 of minimum-bounding box 602.

Persona-region location 506 is a location at an endpoint, on the border of persona region 550, of the line segment 522, which is the shortest possible line segment between persona-region location 504 and user-interface-focus location 512 (which, in the illustrated embodiment, is the centroid of user-interface region 552).

User-interface-focus location 508 is a location of mouse pointer 204 which, as illustrated in FIG. 5, could be a location of a vertex of mouse pointer 204 (among other possibilities). In at least one embodiment, a user-interface-focus location is a location of a stylus and/or a cursor. In at least one other embodiment, a user-interface-focus location is a touch-based contact point and/or a location in a contact area (e.g., if the user interface allows for touch-based input). And certainly other possible examples could be listed here.

In at least one embodiment, the user-interface-focus location is a location within user-interface region 552, which, in the embodiment illustrated in FIG. 5, is the region of window 206. As shown, user-interface-focus location 510 is a location within user-interface region 552 that is closest to a given persona-region location. In the illustrated embodiment, user-interface-focus location 510 is located at an endpoint of line segment 516 (as described above). User-interface-focus location 512 is a centroid of user-interface region 552. In at least one embodiment, a user-interface-focus location of user-interface region 552 is the centroid of user-interface region 552 itself. User-interface-focus location 514 is an endpoint of line segment 522 on the border of user-interface region 552.

In at least one embodiment, user-interface region 552 is a focus-window region of a focus window, which could be, e.g., a window (or other component) that will receive any input (e.g., via a keyboard or mouse). For example, text entered at keyboard 304 or pasted from a clipboard may be sent to the focus window. Focus may be withdrawn from the focus window by giving another window (or other user-interface element) the focus, e.g., by determining that another window or other user-interface element has been selected. Accordingly, the focus window may be a selected window—perhaps selected by a mouse click (via mouse 308) on another window or user-interface element that can receive focus. In at least one embodiment, the selected window is a moved window—moved, for example, by selecting a window and dragging the selected window to another location.

Figure 7:
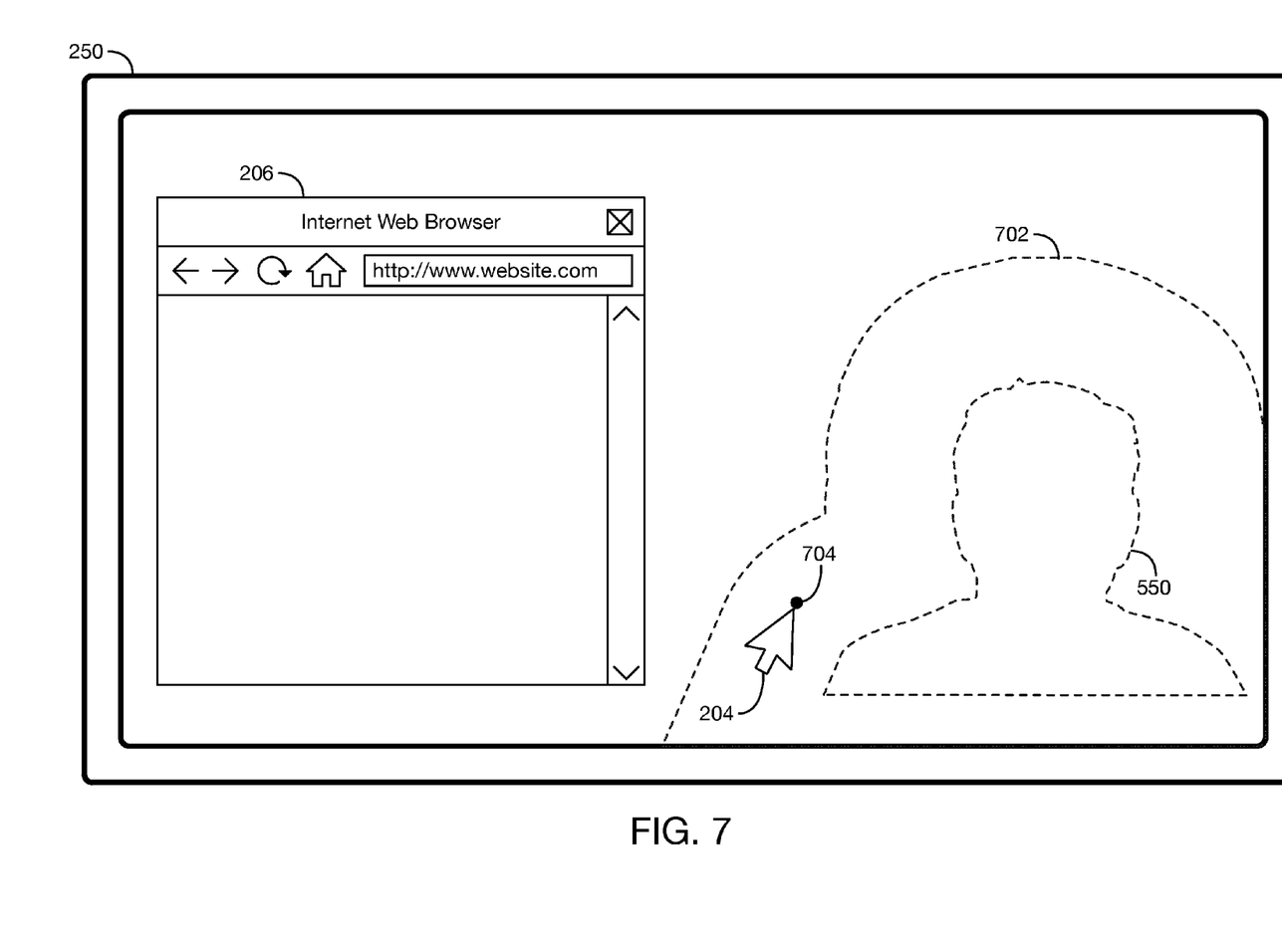
FIG. 7 depicts a deemphasize region of persona region 550, in accordance with at least one embodiment.

Though various embodiment have been described in which the persona-deemphasize determination made at step 406 is based on a calculated display distance between an identified persona-region location and the identified user-interface-focus location, those of skill in the art will appreciate that the persona-deemphasize determination may be made by different and/or additional means. For example, the persona-deemphasize determination may be based on a determination that the user-interface-focus location is within a deemphasize region of the persona region. To illustrate, FIG. 7 depicts an example deemphasize region of persona region 550, in accordance with at least one embodiment. As shown, a user-interface-focus location 704 is within an example deemphasize region 702 of persona region 550.

Figure 8:
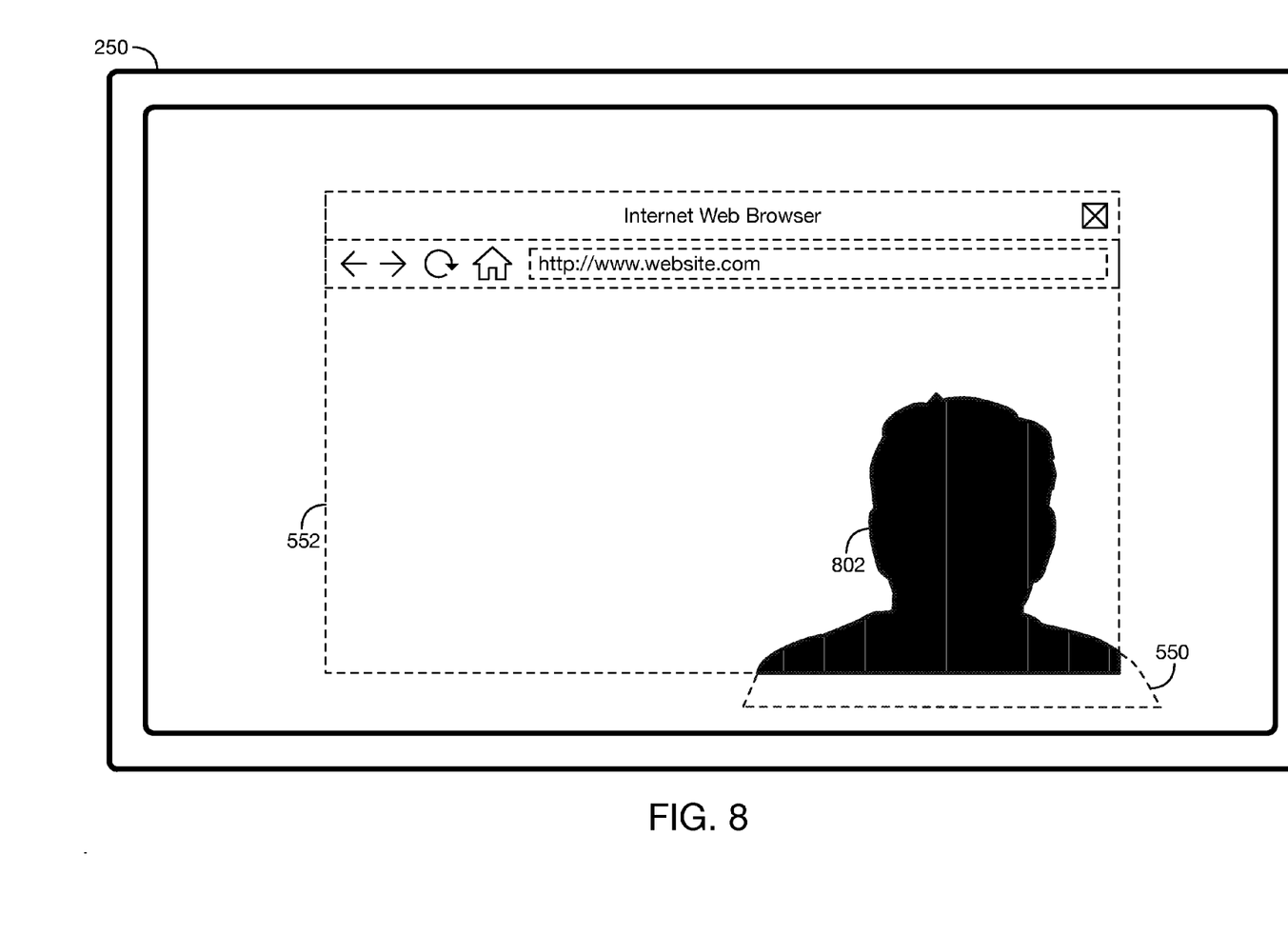
FIG. 8 depicts a user-interface region that overlaps a persona region, in accordance with at least one embodiment.

As another example, the persona-deemphasize determination may be a partial-overlap determination that the user-interface region at least partially overlaps the persona region. To illustrate, FIG. 8 depicts a user-interface region that overlaps a persona region, in accordance with at least one embodiment. A partial-overlap region 802 (indicated with diagonal hatching) includes overlapping regions of persona region 550 and user-interface region 552. In an embodiment, the persona-deemphasize determination is a total-overlap determination that user-interface region 552 totally overlaps persona region 550.

With respect to step 408, visually deemphasizing displayed persona 202 could include, for example, decreasing an opacity of the displayed persona, changing a position of the displayed persona, and/or decreasing a display size of the displayed persona, among numerous other possibilities that will be known to those of skill in the art.

Figure 9:
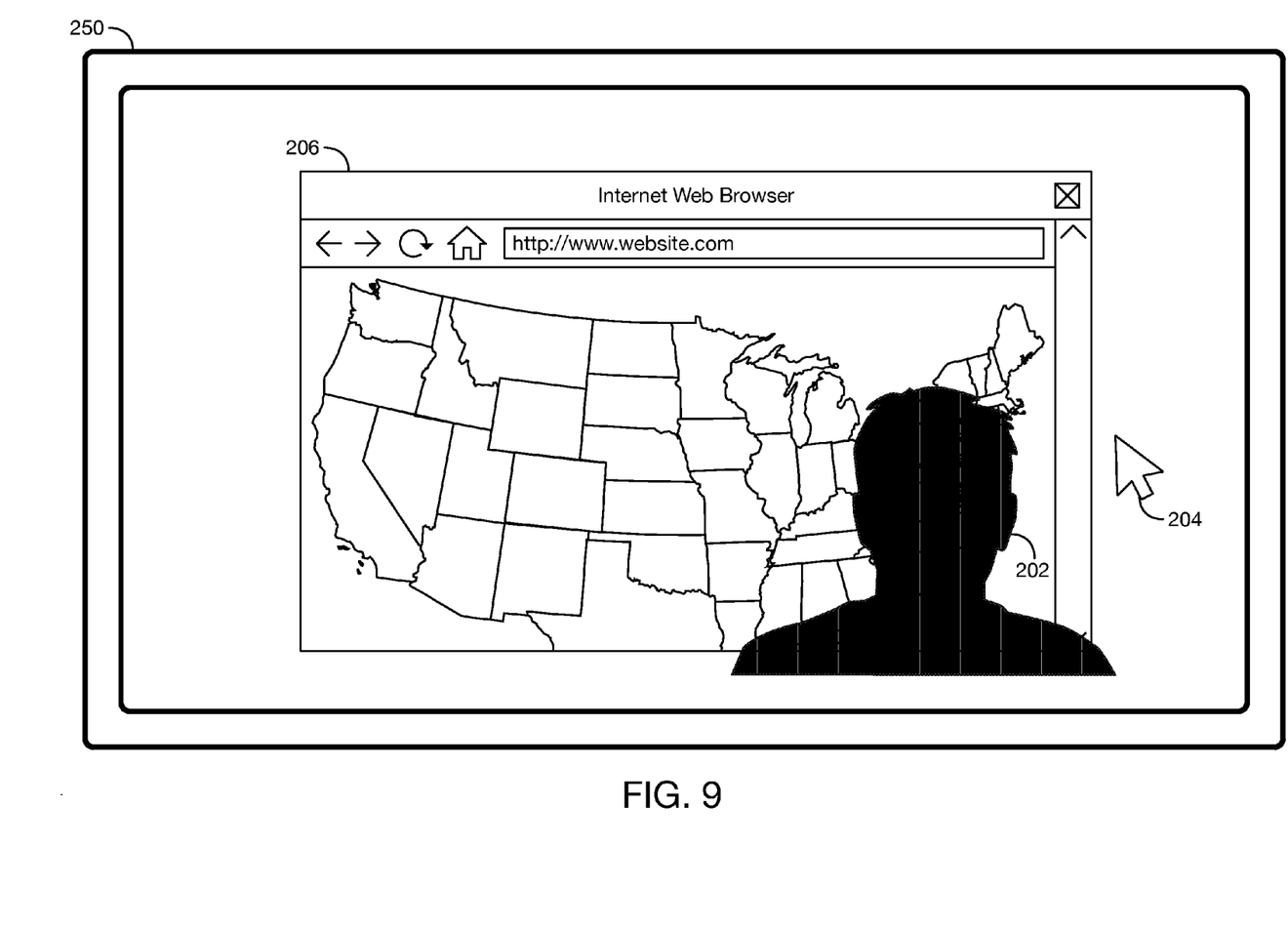
FIG. 9 depicts a displayed persona having a decreased opacity, in accordance with at least one embodiment

FIG. 9 depicts displayed persona 202 having a decreased opacity, in accordance with at least one embodiment. The decreased opacity is represented with diagonal hatching. As shown in FIG. 9, the contents of window 206 (which were previously blocked by displayed person 202) may be partially or completely visible through the displayed persona as a result of decreasing the opacity of displayed persona 202. Decreasing the opacity of displayed persona 202 could include increasing an alpha value of one or more pixels of the displayed persona (as described above).

Figure 10:
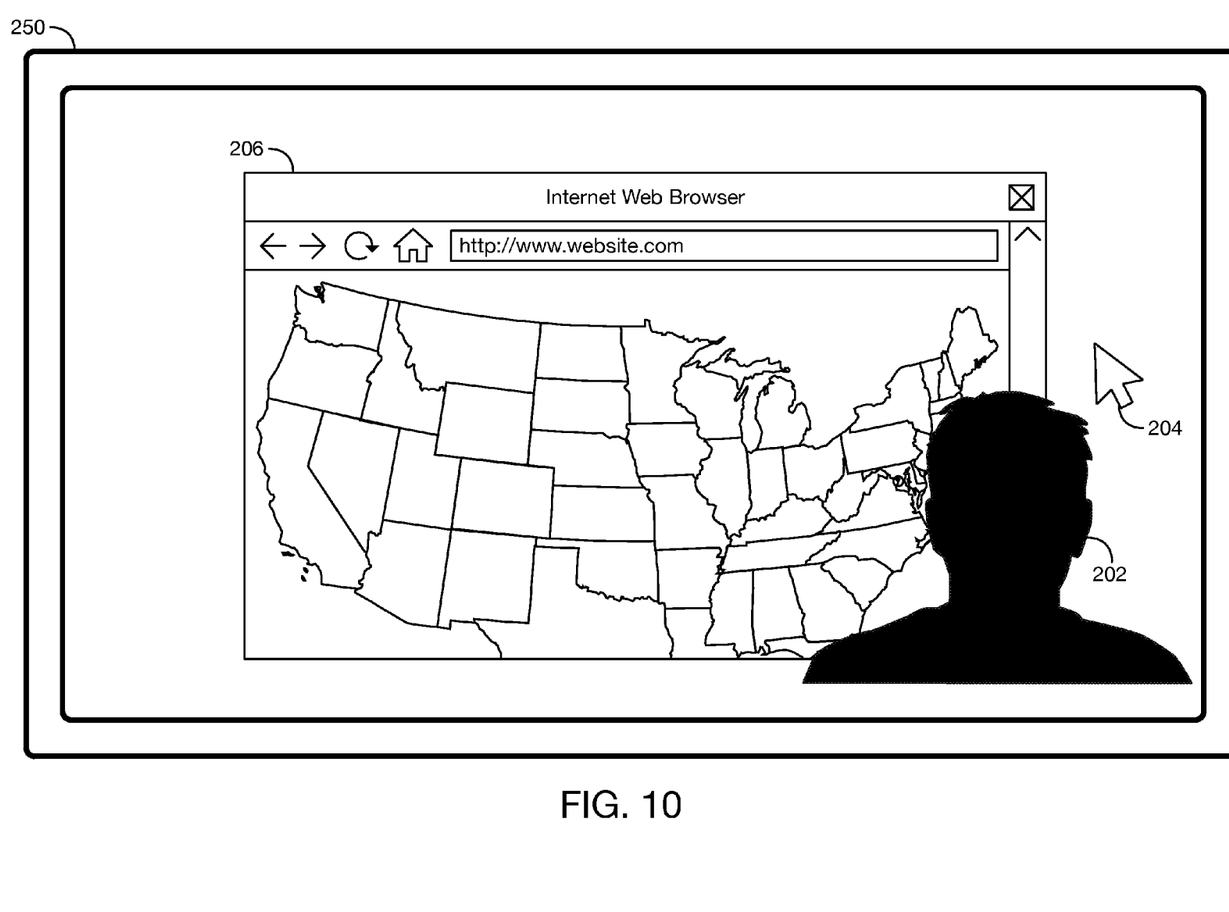
FIG. 10 depicts a repositioned displayed persona, in accordance with at least one embodiment.

FIG. 10 depicts a repositioned displayed persona, in accordance with at least one embodiment. As shown, displayed persona 202 has been repositioned as compared to displayed persona depicted in FIG. 2. The contents of window 206 may be partially or completely visible as a result of repositioning displayed persona 202.

Figure 11:
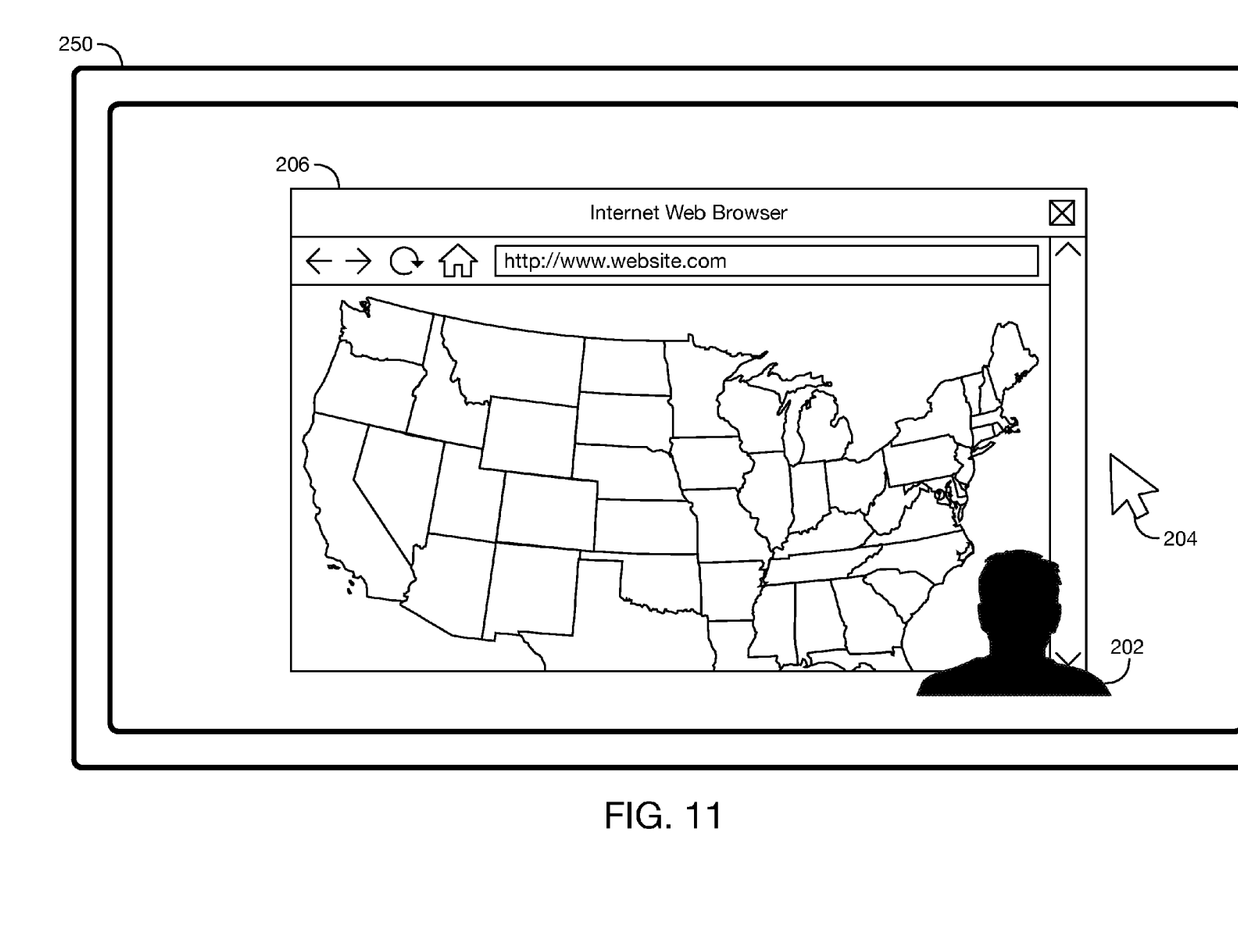
FIG. 11 depicts a displayed persona that has been decreased in size, in accordance with at least one embodiment.

FIG. 11 depicts a displayed persona that has been decreased in size, in accordance with at least one embodiment. As shown, the display size of displayed persona 202 has been decreased as compared to displayed persona 202 depicted in FIG. 2. The contents of window 206 may be partially or completely visible as a result of decreasing the display size of displayed persona 202.

The magnitude of the visual de-emphasis could be based on the calculated display distance (among other possible factors). In an embodiment, the magnitude of the visual de-emphasis is proportional to the calculated display distance. For example, the opacity and/or size of displayed persona 202 could gradually decrease as the calculated display distance gradually decreases (e.g., as mouse pointer 204 gradually moves closer to persona region 550).

The magnitude of the visual de-emphasis could be based on the displayed contents of window 206 and/or another UI element. For example, a change of a displayed slide in a multi-slide presentation and/or a movement of a character in a video game (as displayed in window 206) could result in a greater amount of visual de-emphasis as compared to no change of the displayed contents of window 206. Relatedly, the persona-deemphasize determination could be made in response to (and/or based on) a change of the displayed contents of window 206 and/or another UI element.

Figure 12:
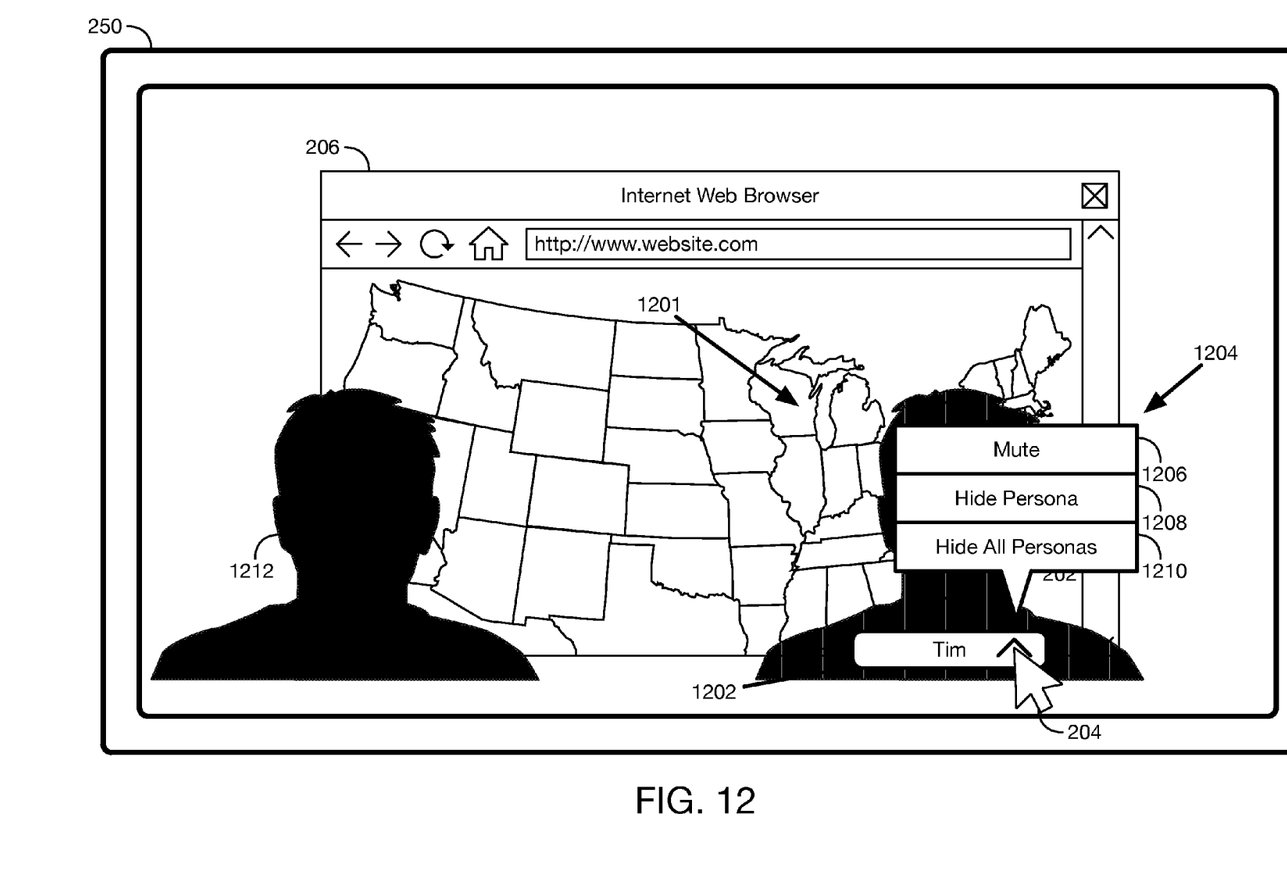
FIG. 12 depicts a user-interface-adjustment menu, in accordance with at least one embodiment.

FIG. 12 depicts a user-interface-adjustment menu, in accordance with at least one embodiment. As shown, user-interface-adjustment menu 1201 at least partially overlaps the persona region of displayed persona 202. Additionally, user-interface-adjustment menu 1201 includes a set 1204 of one or more user-interface-adjustment-menu options 1206, 1208, and 1210 that are associated with respective user-interface-adjustment functions. The user-interface-adjustment functions could include, for example, muting an audio presentation associated with displayed persona 202 and/or hiding one or more personas such as displayed persona 202. UI-management device 302 may present user-interface-adjustment menu 1201 in response to making the persona-deemphasize determination at step 408, for example. In at least one embodiment, a user-interface-adjustment-menu option to hide a persona takes the form of a filmstrip-type user-interface element into which and out of which personas (e.g., thumbnail-sized personas) can be popped (using, e.g., a mouse click and drag sequence). And while a filmstrip-type user element (i.e., one having serially connected persona "pop-in" and "pop-out" locations) is one option, certainly options with multiple sets of one or more persona pop-in and pop-out locations distributed about a user-interface display could be implemented. And other example implementations could be listed as well.

In the embodiment depicted in FIG. 12, user-interface-adjustment menu 1201 also includes a persona caption 1202 that identifies the displayed persona. UI-management device 302 could present set 1204 of user-interface-adjustment-menu options 1206-1210 in response to determining, for example, that the user-interface-focus location is within a threshold proximity to the persona region of displayed persona 202.

Although features and elements are described above in particular combinations, those having ordinary skill in the art will appreciate that each feature or element can be used alone or in any combination with the other features and elements without departing from the scope and spirit of the present disclosure.

The invention claimed is:

1. A method carried out by a user-interface-management device, the method comprising:
   identifying, on a user interface, a persona-region location of a persona region of a displayed persona, wherein the displayed persona is representative of a presenter in an online data communication;
   identifying, on the user interface, a user-interface-focus location;
   making a persona-deemphasize determination based on a display distance between the identified persona-region location and the identified user-interface-focus location; and
   in response to making the persona-deemphasize determination, visually deemphasizing the displayed persona.

2. The method of claim 1, wherein the persona-deemphasize determination is further based on a determination that the display distance is less than a proximity threshold.

3. The method of claim 1, wherein the identified persona-region location is a location within the persona region that is closest to the identified user-interface-focus location.

4. The method of claim 1, wherein the identified persona-region location is a centroid of the persona region.

5. The method of claim 1, wherein the identified persona-region location is a centroid of a minimum-bounding box that encloses the persona region.

6. The method of claim 1, wherein the persona-deemphasize determination comprises a determination that the identified user-interface-focus location is within a deemphasize region of the persona region.

7. The method of claim 1, wherein the identified user-interface-focus location is a mouse-pointer location.

8. The method of claim 1, wherein the identified user-interface-focus location is a stylus location.

9. The method of claim 1, wherein the identified user-interface-focus location is a location of a user-interface region.

10. The method of claim 9, wherein the user-interface region is a focus-window region of a focus window.

11. The method of claim 10, wherein the focus window is a selected window.

12. The method of claim 11, wherein the selected window is a moved window.

13. The method of claim 9, wherein the identified user-interface-focus location is a location within the user-interface region that is closest to the identified persona-region location.

14. The method of claim 9, wherein the identified user-interface-focus location is a centroid of the user-interface region.

15. The method of claim 9, wherein the identified user-interface-focus location is a centroid of a minimum-bounding box that encloses the user-interface region.

16. The method of claim 9, wherein the persona-deemphasize determination comprises a partial-overlap determination that the user-interface region at least partially overlaps the persona region.

17. The method of claim 9, wherein the persona-deemphasize determination comprises a total-overlap determination that the user-interface region totally overlaps the persona region.

18. The method of claim 1, wherein visually deemphasizing the displayed persona comprises decreasing an opacity of the displayed persona.

19. The method of claim 1, wherein visually deemphasizing the displayed persona comprises decreasing a display size of the displayed persona.

20. The method of claim 1, further comprising presenting a user-interface-adjustment menu in response to making the persona-deemphasize determination, wherein the user-interface-adjustment menu (i) at least partially overlaps the persona region and (ii) comprises a set of one or more user-interface-adjustment-menu options that are associated with respective user-interface-adjustment functions.

21. The method of claim 20, wherein one of the respective user-interface-adjustment functions comprises muting an audio presentation associated with the displayed persona.

22. The method of claim 20, wherein one of the respective user-interface-adjustment functions comprises hiding the displayed persona.

23. A user-interface-management device comprising:
   a communication interface;
   a processor; and
   data storage containing instructions executable by the processor for causing the user-interface-management device to carry out a set of functions, the set of functions including:
      identifying, on a user interface, a persona-region location of a persona region of a displayed persona, wherein the displayed persona is representative of a presenter in an online data communication;
      identifying, on the user interface, a user-interface-focus location;
      making a persona-deemphasize determination based on a display distance between the identified persona-region location and the identified user-interface-focus location; and in response to making the persona-deemphasize determination, visually deemphasizing the displayed persona.

24. The user-interface-management device of claim 23, wherein the persona-deemphasize determination is further based on a determination that the display distance is less than a proximity threshold.

25. The user-interface-management device of claim 23, wherein the identified persona-region location is a location within the persona region that is closest to the identified user-interface-focus location.

26. The user-interface-management device of claim 23, wherein the identified persona-region location is a centroid of the persona region.

27. The user-interface-management device of claim 23, wherein the identified persona-region location is a centroid of a minimum-bounding box that encloses the persona region.

28. The user-interface-management device of claim 23, wherein the persona-deemphasize determination is based on comprises a determination that the identified user-interface-focus location is within a deemphasize region of the persona region.

29. The user-interface-management device of claim 23, wherein the identified user-interface-focus location is a mouse-pointer location.

30. The user-interface-management device of claim 23, wherein the identified user-interface-focus location is a stylus location.

31. The user-interface-management device of claim 23, wherein the identified user-interface-focus location is a location of a user-interface region.

32. The user-interface-management device of claim 31, wherein the user-interface region is a focus-window region of a focus window.

33. The user-interface-management device of claim 32, wherein the focus window is a selected window.

34. The user-interface-management device of claim 33, wherein the selected window is a moved window.

35. The user-interface-management device of claim 31, wherein the identified user-interface-focus location is a location within the user-interface region that is closest to the identified persona-region location.

36. The user-interface-management device of claim 31, wherein the identified user-interface-focus location is a centroid of the user-interface region.

37. The user-interface-management device of claim 31, wherein the identified user-interface-focus location is a centroid of a minimum-bounding box that encloses the user-interface region.

38. The user-interface-management device of claim 31, wherein the persona-deemphasize determination comprises a partial-overlap determination that the user-interface region at least partially overlaps the persona region.

39. The user-interface-management device of claim 31, wherein the persona-deemphasize determination comprises a total-overlap determination that the user-interface region totally overlaps the persona region.

40. The user-interface-management device of claim 23, wherein visually deemphasizing the displayed persona comprises decreasing an opacity of the displayed persona.

41. The user-interface-management device of claim 23, wherein visually deemphasizing the displayed persona comprises decreasing a display size of the displayed persona.

42. The user-interface-management device of claim 23, wherein the set of functions further includes presenting a user-interface-adjustment menu in response to making the persona-deemphasize determination, wherein the user-interface-adjustment menu (i) at least partially overlaps the persona region and (ii) comprises a set of one or more user-interface-adjustment-menu options that are associated with respective user-interface-adjustment functions.

43. The user-interface-management device of claim 42, wherein one of the respective user-interface-adjustment functions comprises muting an audio presentation associated with the displayed persona.

44. The user-interface-management device of claim 42, wherein one of the respective user-interface-adjustment functions comprises hiding the displayed persona.

* * * * *